United States Patent [19]
Hercher

[11] Patent Number: 5,812,266
[45] Date of Patent: Sep. 22, 1998

[54] NON-CONTACT POSITION SENSOR

[75] Inventor: Michael Hercher, Marblehead, Mass.

[73] Assignee: Hewlett-Packard Company, Palo Alto, Calif.

[21] Appl. No.: 573,170

[22] Filed: Dec. 15, 1995

[51] Int. Cl.⁶ .................................................. G01B 11/14
[52] U.S. Cl. ..................................... 356/375; 250/559.29
[58] Field of Search .................................... 356/154, 373, 356/375; 250/559.29, 559.31, 551.32, 559.07; 369/44.17, 44.18, 44.19, 44.21; 360/77.03

[56] References Cited

U.S. PATENT DOCUMENTS

| | | | |
|---|---|---|---|
| 4,122,551 | 10/1978 | Urbach | 365/234 |
| 4,786,815 | 11/1988 | Walker et al. | 250/560 |
| 4,823,170 | 4/1989 | Hansen | 356/375 |
| 4,866,362 | 9/1989 | Parker et al. | 318/368.1 |
| 5,079,432 | 1/1992 | Miller | 250/561 |
| 5,144,833 | 9/1992 | Amer et al. | 73/105 |
| 5,187,546 | 2/1993 | Johnston | 356/358 |
| 5,194,919 | 3/1993 | Katayama | 356/375 |
| 5,235,416 | 8/1993 | Stanhope | 358/101 |
| 5,268,801 | 12/1993 | Hazel et al. | 360/77.03 |
| 5,294,804 | 3/1994 | Kajimura | 250/561 |
| 5,311,378 | 5/1994 | Williams et al. | 350/77.03 |
| 5,315,372 | 5/1994 | Tsai | 356/358 |
| 5,319,509 | 6/1994 | Michelson et al. | 360/77.03 |
| 5,325,349 | 6/1994 | Taniguchi | 369/109 |
| 5,367,373 | 11/1994 | Busch-Vishniac et al. | 356/139 |
| 5,383,026 | 1/1995 | Mouri et al. | 356/376 |
| 5,424,556 | 6/1995 | Symosek et al. | 250/561 |

FOREIGN PATENT DOCUMENTS

| | | |
|---|---|---|
| S62-12972 | 1/1978 | Japan . |
| S53-107805 | 9/1978 | Japan . |
| S62-257680 | 11/1978 | Japan . |
| S55-48872 | 4/1980 | Japan . |
| S63-184972 | 7/1983 | Japan . |
| S58-135906 | 8/1983 | Japan . |
| S58-139370 | 8/1983 | Japan . |
| S60-209981 | 10/1985 | Japan . |
| S62-298061 | 12/1987 | Japan . |
| S63-271777 | 11/1988 | Japan . |
| H1-137463 | 5/1989 | Japan . |
| H1-184676 | 7/1989 | Japan . |
| H1-296473 | 11/1989 | Japan . |
| H2-134778 | 5/1990 | Japan . |
| H2-276073 | 11/1990 | Japan . |
| H3-147578 | 6/1991 | Japan . |
| H3-272066 | 12/1991 | Japan . |
| H3-288380 | 12/1991 | Japan . |
| H4-360080 | 12/1992 | Japan . |
| H5-198110 | 8/1993 | Japan . |
| H6-103714 | 4/1994 | Japan . |

OTHER PUBLICATIONS

Edwards, I., "Using Photodetectors for Position Sensing", Sensors, 5 pages, Dec., 1988.

CMX Systems, Inc. Press Release, 6 pages, Dec., 1991.

Hewlett–Packard Company, Application Note 325–12, "Non–contact Measurements with Laser Interferometers", pp. 1–15, Copyright 1991.

(List continued on next page.)

*Primary Examiner*—Frank G. Font
*Assistant Examiner*—Zandra V. Smith

[57] ABSTRACT

A device for measuring the displacement of a movable object includes a stationary light source that produces an incident light beam. A target feature, attached to, or integral with, the object, reflects the incident light beam. A stationary photodetector, spaced from the object, receives the reflected light beam and, in response thereto, produces an electric signal having a characteristic (such as amplituded) which is proportional to a received location on the photodetector of the reflected light beam and which represents a position of the object. An imaging lens receives the reflected light beam and focusses an image of the light source on the photodetector. The target feature includes a curved surface that reflects the light beam such that a small, point-like or line-like image of the light source is focussed on the photodetector. The displacement sensor device is particularly useful in a disk drive servo system application.

16 Claims, 8 Drawing Sheets

OTHER PUBLICATIONS

Hewlett–Packard Company, Application Note 325–11, "Disk Drive Servo–Track Writing", pp. 1–27, Copyright, 1991.

"HDA's Actuator Pushed by Rotary Stage," Data Storage Symposium, Hewlett–Packard, 1 page.

"High Density Digital Recording," K.H.J. Buschow et al., NATO ASI Series, Series E: Applied Sciences–vol. 229, 1993.

"Measurement of Laser Diode Spot Size and Source Astigmatism Using a Phase–Shifting Interferometer," Scott L. DeVore, SPIE vol. 899 Optical Storage Technology and Applications (1988), pp. 39–45.

"Optical Card Tracking Servo System Utilizing Two Light Sources," Keiichi Tsutsui et al., SPIE vol. 1316 Optical Data Storage (1990), pp. 341–344.

"Erasable Digital Audio Disc System," Kenji Torazawa et al., 1985 Optical Data Storage, Development Center, Sanyo Electric Co., Ltd., pp. TuAA2-1 –TuAA2-6.

"A New Tracking Servo Technology," S. Arai et al., Fujitsu Laboratories Ltd., 1985 Optical Data Storage, pp. ThBB3-1 –ThBB3-4.

"Diffraction analysis and evaluation of several focus–and track–error detection schemes for magneto–optical disk systems," B.E. Bernacki et al., SPIE vol. 1663 Optical Data Storage (1992), pp. 150–156.

"Effect of Track Crossing on Focus Servo Signals: Feedthrough," M.R. Latta et al., IBM Almaden Research Center, SPIE vol. 1663 Optical Data Storage (1992), pp. 157–163.

"Servo Issues with Continuous Pregroove Media," K.W. Getreuer, Applied Magnetics Corporatiion, SPIE vol. 1663 Optical Data Storage (1992), pp. 128–135.

"Optical and mechanical design of magneto–optical disk heads," Teruo Fujita et al., Mitsubishi Electric Corp., SPIE vol. 1663 Optical Data Storage (1992), pp. 114–122.

"Integrated device with diffractive polarization components for a magneto–optical disk head," C.W. Haggans et al., Optical Sciences Center, SPIE vol. 1663 Optical Data Storage (1992), pp. 46–57.

"Optical Disk Digital Memory System," Y. Ichiyama et al., NEC Corporation, 1984 Optical Data Storage, pp. WC-A3-1 –WC-A-3-4.

"Optical Disk File Memory for Computer Use," Yoshito Tsunoda et al., Hitachi, Ltd., 1984 Optical Data Storage, pp. WC-A2-1 –WC-A2-4.

"CD Error Characterization: Differences Between CD–ROM and Writable CD," D.G. Howe, Optical Data Storage Center, SPIE vol. 2338 Optical Data Storage (1994), pp. 2–5.

"Storage Technology Corporation Optical Storage Error Controls," S.R. Perera et al., Storage Technology Corp., 1984 Optical Data Storage, WC-C2-1 –WC-C2-4.

"Digital Magneto–Optical Disk Drive," T. Deguchi et al., Central Research Laboratories, Sharp Corp., 1984 Optical Data Storage, pp. ThC-C1-1 –ThC-C1-4.

"An Interactive Multiple Servo System for an Optical/Digital Drive," K.W. Getreuer et al., Optical Peripherals Laboratory, 1984 Optical Data Storage, pp. FC-B1-1 –FC-B1-4.

"A Magneto–optic Polarization Readout Model," D.K. Campbell et al., Hewlett–Packard Company, 1985 Optical Data Storage, pp. TuBB2-1 –TuBB2-4.

"Electro Static Discharge Protection for Magneto Resistive Head/Arm Assembly," IBM Corp. 1993, IBM Technical Disclosure Bulletin, vol. 36 No. 12 Dec. 1993, pp. 271–272.

"Curved Flexible Printed Circuit Cable," IBM Corp. 1993, IBM Technical Disclosure Bulletin, vol. 36 No. 02 Feb. 1993, pp. 243–244.

"Piezoelectric Actuator for Small Hard Disk Drive," IBM Corp. 1993, IBM Technical Disclosure Bulletin, vol. 36, No. 02, Feb. 1993, pp. 379–380.

"Multifunction Optical Storage Device," IBM Corp. 1990, IBM Technical Disclosure Bulletin, vol. 33, No. 6B Nov. 1990, pp. 20–23.

"Low Profile Hybrid Disk Enclosure," IBM Corp. 1993, IBM Technical Disclosure Bulletin, vol. 36, No. 08 Aug. 1993, pp. 61–63.

"High speed accessing magneto–optical disk drive," H. Ishibashi et al., Matsushita Electric Industrial Co., Inc., SPIE vol. 899 Optical Storage Technology and Applications (1988), pp. 8–15.

"Fast Access Actuator for Optical Disk Memory," Keiichi Yoshizumi et al., Matsushita Electric Industrial Co., Ltd., 1985 Optical Data Storage, pp. ThAA5-1 –ThAA5-4.

"Retro–Directive Prism for an Optical Storage Head," IBM Corp. 1990, IBM Technical Disclosure Bulletin, vol. 33 No. 6A Nov. 1990, p. 278.

"Enhanced Means for Rapid Reading and Writing of Cylinders in Small or Thermally Active Multidisk File Memories," IBM Corp. 1990, IBM Technical Disclosure Bulletin, vol. 33 No. 4 Sep. 1990, pp. 88–89.

"Multi–Rate Servo for the Reduction of Magneto–Restrictive Head 'On' Time," IBM Corp. 1990, IBM Technical Disclosure Bulletin, vol. 33 No. 4 Sep. 1990, pp. 352–353.

"Single Optical Head, Single Rotary Dual–Beam Arm," IBM Corp. 1990, IBM Technical Disclosure Bulletin vol. 33 No. 4 Sep. 1990, pp. 202–203.

"Fine–Tracking Mechanism by Moving Silicon Laser Mount," IBM Corp. 1993, IBM Technical Disclosure Bulletin vol. 36 No. 09B Sep. 1993, pp. 119–123.

"New flying optical head for high speed accessing," S. Yamaguchi et al., Fuji Xerox Co., Inc., SPIE vol. 1248 Storage and Retrieval Systems and Applications (1990) pp. 96–103.

"High–speed servo technology for optical disk drive," K. Katoh et al., Nippon Telegraph and Telephone Corp., SPIE vol. 899 Optical Storage Technology and Application (1988), pp. 24–30.

"Laser–feedback noise in magneto–optical recording," B.J. Finkelstein et al., IBM Corp., SPIE vol. 899 Optical Storage Technology and Applications (1988), pp. 69–76.

"Development of Pre–groove Writer," J. Ichihara et al., Fujitsu Laboratories, Ltd., SPIE vol. 899 Optical Storage Technology and Applications (1988), pp. 116–122.

"Recent studies of miniaturization of optical disk pickups in Japan," H. Nishihara, Osaka University, SPIE vol. 1248 Storage and Retrieval Systems and Applications (1990), pp. 88–95.

"The Complete Compact Disk Player," M. Clifford, Chapter II Operational Anaysis, Processing of the Audio Signal, 1987, pp. 251–261.

"High Speed Accessing by Direct Accessing," K. Koumura et al., Reprinted: Japanese Journal of Applied Physics, vol. 28 Suppl 28-3, pp 73–76 (1989), pp. 422–425.

"Complete Guide to Compact Disk Player Troubleshooting and Repair," J.D. Lenk, 1986, pp. 7–17.

"Acousto–Optic Accessing in Optical Disks," K. Matsumoto et al., Hitachi Ltd., Reprinted: Japanese Journal of Applied Physics, vol. 28, Suppl.28–3, pp. 335–340 (1989), pp. 426–431.

"Multi–beam magneto–optical disk drive for parallel read/write operation," R. Katayama et al., NEC Corp., Reprinted: Optical Data Storage Topical Meeting Proc. SPIE vol. 1078 pp. 98–104 (1989), pp. 215–221.

"Error Integlation Servo System/System Components and Operation," SPIE vol. 695 Optical Mass Data Storage II (1986), pp. 134–137.

"Ch. 5, Typical CD Player and CD–ROM Circuits," Lenk's Laser Handbook, J.D. Lenk, 1992, pp. 5.1–5.13.

"Position Sensitive Detection System in a Read–Only Optical Head–A Novel Approach,"0 D. Gibson et al., Storage and Recording Systems, 5–7 Apr. 1994, Conference Publication No. 402, IEE 1994, pp. 81–85.

"High track density magneto–optical recording using a crosstalk canceler," K. Kayanuma et al., NEC Corp., Reprinted: Optical Data Storage, Proc. SPIE vol. 1316 pp. 35–39 (1990), pp. 159–163.

"An 86mm magneto–optical disk drive with a compact and fast–seek–time optical head," N. Eguchi et al., Reprinted: Optical Data Storage, Proc. SPIE vol. 1316, pp. 2–10 (1990), pp. 436–444.

"Magneto–optical disk for coded data storage," M. Ojima et al., Hitachi Ltd., SPIE vol. 529 Optical Mass Data Storage (1985), pp. 12–18.

"Supersmall flying optical head for phase change recording media," H. Ukita et al., Reprinted: Applied Optics, vol. 28(20), pp. 4360–4365 (Oct. 15, 1988), pp. 330–335.

"A New Focus Servo Method for Magneto–Optical Disk Systems," M. Oka et al., Reprinted: Japanese Journal of Applied Physics, vol. 26, Suppl. 26–4, pp. 187–190 (1987), pp. 409–412.

"Two–beam Optical Head," K. Hamada et al., Fujitsu Laboratories Ltd., SPIE vol. 695 Optical Mass Data Storage II (1986), pp. 182–186.

"Interlinked Tracking Servo Technology," S. Arai et al., Fujitsu Laboratories, Ltd., Reprinted: Optical Mass Data Storage II, Proc. SPIE vol. 695, pp. 141–146 (1986), pp. 381–385.

"A New Flying Optical Head," K. Yasukawa et al., Fuji Xerox co., Inc., Reprinted: Japanese Journal of Applied Physics, vol. 28, Suppl. 28–3, pp. 205–208 (1989), pp. 418–421.

"Measuring Method of Optical Disk Mechanical Characteristics," S. Hara et al., NTT Electrical Communications Lab., SPIE vol. 695 Optical Mass Data Storage II (1986), pp. 26–32.

"Recent studies of miniaturization of optical disk pickups in Japan," H. Mishihara, Osaka Univ., Reprinted: Storage & Retrieval Systems & Applications, Proc. SPIE vol. 1248, pp. 88–96 (1990), pp. 356–363.

"Analysis of Optical Anisotropy of PC Substrate for M–O Disk and Its Effect on CNR," A. Yoshizawa et al. Olympus Optical Co., Ltd. SPIE vol. 695 Optical Mass Data Storage II (1986), pp. 91–98.

"Compact–size optical head for magneto–optical disk drive," T. Fujita et al., Mitsubishi Electric Corp., SPIE vol. 695 Optical Mass Data Storage II (1986), pp. 187–193.

MagaHaus Hard Drives, PC Magazine Aug. 1994.

TC Computers, PC Magazine Oct. 1994.

Seagate the Data Technology Company, A Winner in Every Event, PC Magazine Oct. 1994.

Insight, PC Magazine Mar. 1995.

NON-CONTACT POSITION SENSOR

FIELD OF THE INVENTION

The present invention relates generally to a method and apparatus for accurately measuring minute displacements of a movable object and, more particularly, to a simple, yet precise, optical method and apparatus for providing such displacement measurements.

BACKGROUND OF THE INVENTION

There is a great need in many applications to monitor the positions of a movable object relative to a desired position or positions. For example, it is desirable in disk drive servo systems to accurately detect the positions of a rotatable read/write head arm, relative to desired, known positions, so that the head arm can be moved into alignment with desired radial track locations on a disk to enable the read/write head to read from and write to such locations. Position sensing devices are devices aimed at providing such position detection. Displacement sensors are position sensing devices that monitor the positions of a movable object by repeatedly measuring the displacements of the object from a desired location.

Examples of conventional displacement sensors include capacitance gage devices, fiber-optic proximity sensors and optical sensors, such as interferometric sensors used commonly in disk drive servo systems. Many of the prior art displacement sensors either are incapable of achieving the degree of resolution (the smallest measureable displacement) required by certain applications (such as disk drive servo systems) or require expensive and/or complex circuitry and hardware to achieve such resolution. To achieve high resolution, certain displacement sensors require, for example, a precise and powerful laser light source and extremely close proximity between the sensing element and movable object, rendering such devices expensive and difficult to implement. Thus, a balance must be struck between device performance and simplicity.

U.S. Pat. No. 5,315,372 to Tsai describes a prior art disk drive servo system that employs an optical displacement sensor. The Tsai device includes a light source and a photodetector array attached, at spaced-apart locations, to a rotatable master arm, located externally of the disk drive. A reflector is attached to a rotatable read/write head arm at a location between the read/write head and the axis of rotation of the arm. During operation, the master arm first is aligned accurately with a desired radial track location on the disk using an interferometric device. Then, the displacement sensor operates to determine the position of the head arm relative to the master arm so that the head arm can be moved into alignment with the master arm.

The light source of the displacement sensor produces an incident light beam that is reflected by the reflector onto the photodetector array. The position on the photodetector array to which the light beam is reflected depends on the relative radial positions of the head and master arms. Each photodetector element of the array produces an electric signal having an amplitude proportional to the intensity of the received light. The signals produced by the array, thus, represent the relative radial positions of the head and master arms. Processing circuitry receives and decodes the signals output by the array to determine the relative head arm position and accordingly controls a motor to rotate the head arm until it is properly aligned.

The device disclosed in the Tsai patent suffers from a number of drawbacks. While the Tsai device is relatively structurally simple and fairly inexpensive to implement, it is burdensome to operate. The Tsai device requires a preknowledge of each master arm and relative head arm position in order to accurately interpret the electric signals produced by the photodetector array. Also, due to the significant spacing between the reflector and the read/write head on the head arm and, due also to the dual axes of rotation of the head arm and master arm, performance accuracy is sacrificed severely.

It accordingly is a general object of the present invention to provide a simple, yet accurate, displacement sensor.

SUMMARY OF THE INVENTION

One embodiment of the present invention is directed to a device for measuring the displacement of a movable object. The device includes a stationary light source that produces an incident light beam. A target feature, attached to, or integral with, the object, reflects the incident light beam. A stationary photodetector, spaced from the object, receives the reflected light beam and, in response thereto, produces an electric signal having a characteristic (such as amplitude) which is proportional to an instantaneous position on the photodetector of the reflected light beam and which represents the position of the object. An imaging lens receives the reflected light beam and focusses an image of the light source on the photodetector. The target feature includes a curved surface that reflects the light beam such that a small, preferably point-like or line-like image of the light source is focussed on the photodetector.

In one embodiment of the invention, the photodetector includes a spatially arranged photodetector, such as a bi-cell photodetector. In another embodiment of the invention, the photodetector includes a position sensor.

In an embodiment of the invention, the target feature preferably has a radius of curvature within the range of 0.2–5.0 mm.

In an embodiment of the invention, the incident light beam and the reflected light beam form a plane substantially perpendicular to the direction of the motion to be sensed. In that embodiment, an axis formed through a center point of each cell of the bi-cell detector is substantially orthogonal to the plane and substantially parallel to a direction of motion of the object.

Another embodiment of the invention is directed to an optical displacement sensor for use in a disk drive servo system. The sensor monitors the relative radial positions of a read/write head arm and a master arm. The device includes a light source, attached to the master arm, that produces an incident light beam. A target feature, attached to, or integral with, an end of the head arm, reflects the incident light beam. A photodetector, attached to the master arm, receives the reflected light beam and, in response thereto, produces an electric signal having an amplitude which is proportional to an instantaneous position on the photodetector of the reflected light beam and which represents a relative position of the head arm. An imaging lens receives the reflected light beam and focusses an image of the light source on the photodetector. The target feature includes a curved surface that reflects the light beam such that a small, preferably point-like or line-like image of the light source is focussed on the photodetector.

A further embodiment of the invention is directed to a method of measuring the displacement of a movable object. The method includes the steps of: producing an incident light beam with a stationary light source; reflecting the incident light beam from a curved surface of a target feature, attached to, or integral with, the object; focussing the reflected light beam as a small, preferably point-like or line-like image of the light source onto a stationary photodetector; and producing, with the photodetector, an electric signal having an amplitude which is proportional to each instantaneous position on the photodetector of the reflected light beam and which represents a position of the object.

The features and advantages of the present invention will be more readily understood and apparent from the following detailed description of the invention, which should be read in conjunction with the accompanying drawings, and from the claims which are appended to the end of the detailed description.

DETAILED DESCRIPTION

Figure 1:
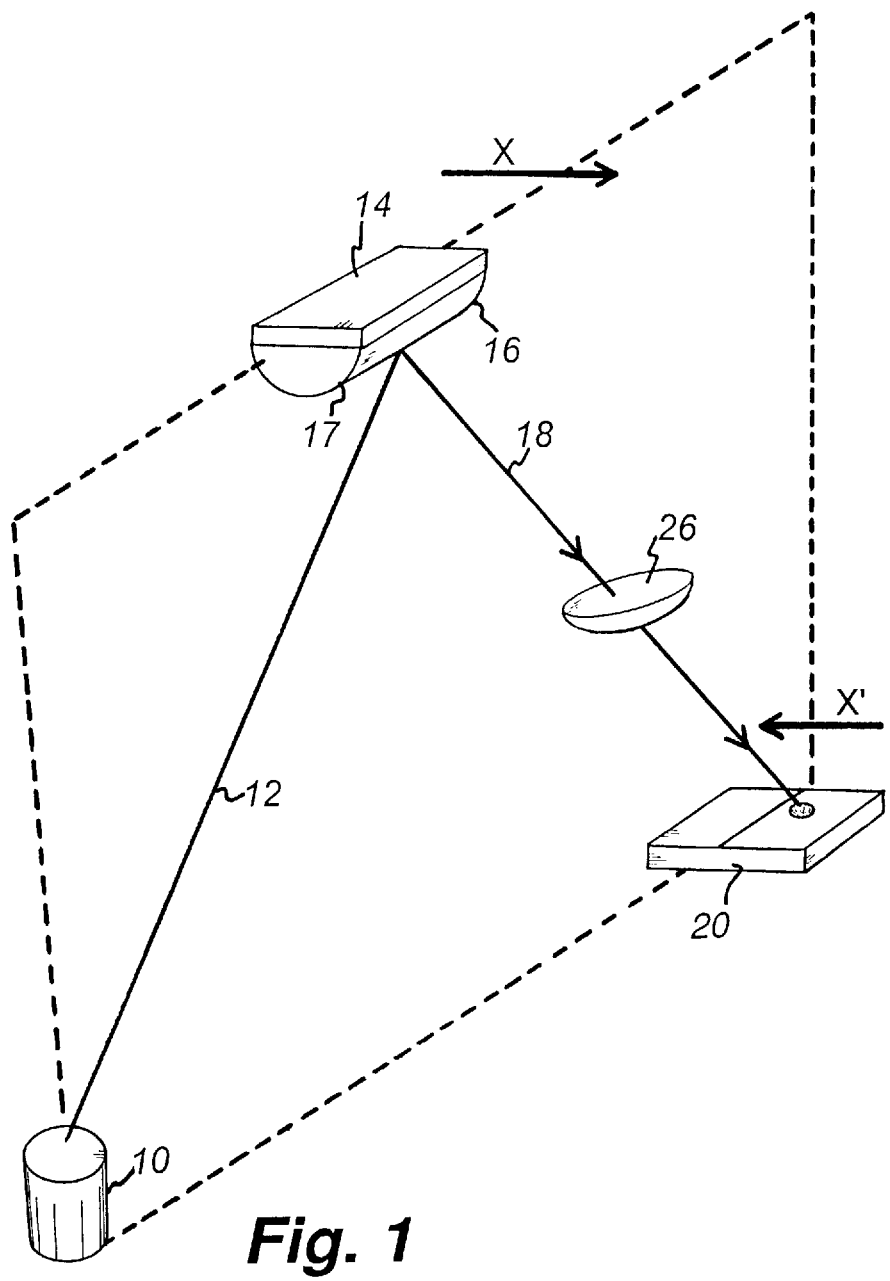
FIG. 1 is a block diagram of a general embodiment of the displacement sensor of the present invention.

FIG. 1 is a general block diagram of one embodiment of the displacement sensor of the present invention. As shown, the sensor includes a stationary light source 10, a movable object 14, a stationary imaging lens 26 and a stationary photodetector 20. A target feature 16 is attached to, or integral with, movable object 14. Object 14 is movable in the direction shown by arrow X and the displacement sensor monitors the position of object 14 by measuring displacements of object 14 from a reference position.

Light source 10 produces an incident light beam 12 which is reflected by target feature 16 as a reflected light beam 18. Light beam 18 is focussed by lens 26 onto a surface of photodetector 20. Photodetector 20, in response to receipt of the reflected light beam 18, produces an electric signal having a characteristic (such as amplitude or frequency) that is proportional to the position on the surface of photodetector 20 at which the reflected light beam is received and, therefore, also corresponds to the present position of the object 14. Processing circuitry (a particular embodiment of which is described below with reference to FIG. 6B) can be connected to the photodetector to receive the electric signals produced by the photodetector and process such signals to determine the position of the object and/or displacement of the object from a known reference position. The circuitry can include both analog and digital signal processing circuitry.

Target feature 16 includes a curved surface 17 which reflects incident light beam 12 such that a small, preferably point-like or line-like, image of source 10 is focussed by lens 26 onto the surface of photodetector 20. Photodetector 20 is increasingly sensitive to smaller displacements as the size of the image is decreased. It, therefore, is desirable to focus a small, point-like or line-like, image of the source onto the photodetector surface.

As will be described in greater detail below, curved surface 17 of target feature 16 can be concave or convex. Target feature 16 can be formed integral with object 14 using a suitable stamping tool. For example, target feature 16 can include a curved surface that is stamped into a portion of object 14. Alternatively, target feature 16 can be a separate element that is affixed to object 14. For example, the target feature 16 can be a cylindrical element such as a pin that is welded, brazed, soldered, screwed or otherwise affixed to object 14. Curved surface 17 of target feature 16 should be sufficiently smooth and preferably polished so that the incident light beam is efficiently reflected.

Referring to FIG. 1, as object 14 is moved in the direction of the arrow X, the position on the surface of photodetector 20 where reflected beam 18 is received moves in the opposite direction, shown by arrow X'. Photodetector 20, in response, produces electric signals wherein each signal has a characteristic (i.e., amplitude or frequency) that is proportional to the position on the photodetector surface of reflected beam 18 and, thus, also to the relative position of object 14.

The displacement resolution of the sensor increases as the size of the image of the light source reflected onto the photodetector surface decreases. Additionally, the displacement resolution of the sensor increases as the intensity of the incident light beam increases. Because the use of a target feature having a curved surface greatly reduces the size of the light source image (i.e., to a point-like or line-like image) reflected onto the photodetector surface, the requirement for a highly efficient and expensive laser light source is greatly relaxed in order to achieve a high degree of displacement resolution.

Figure 2:
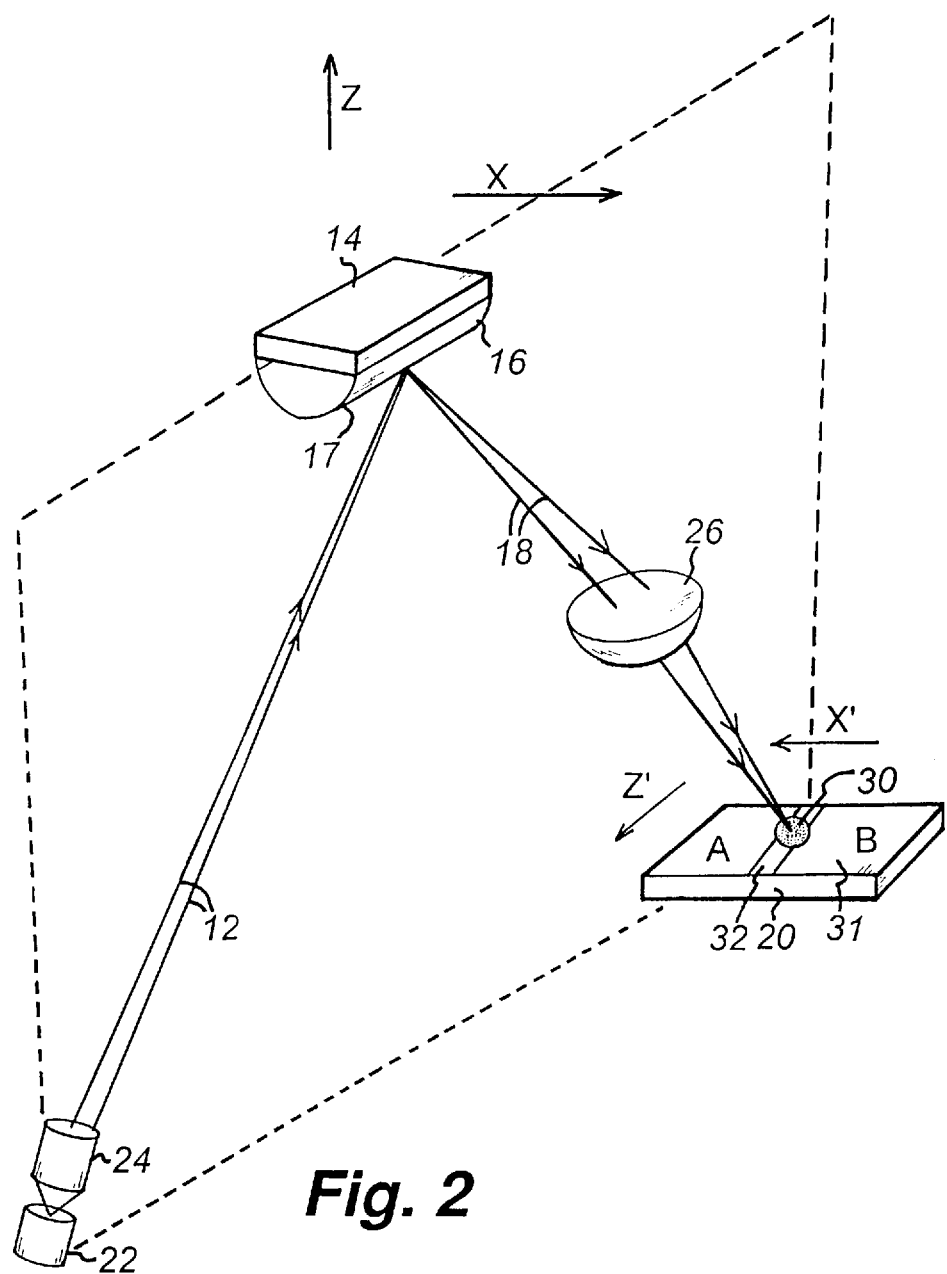
FIG. 2 is a more detailed diagram of a specific embodiment of the displacement sensor of the present invention.

FIG. 2 is a more detailed diagram showing a particular embodiment of the displacement sensor of the present invention. Like elements in FIG. 2 are referred to by identical reference characters to those in FIG. 1. As shown, the sensor includes laser diode light source 22, object 14, to which target feature 16 is attached, and bi-cell photodetector 28. Also included are a gradient index (GRIN) incident laser diode beam collimating lens 24 and reflected beam focussing lens 26.

Laser diode 22 conventionally produces incident laser beam 12 (shown in FIG. 2 as two separate laser beams) which is provided through GRIN collimating lens 24 to target feature 16. Each of laser diode 22, GRIN collimating lens 24 and bi-cell photodetector 28 can be conventional elements. Incident laser beams 12 reflect from curved surface 17 of target feature 16. The reflected laser beams 18 somewhat disperse and are focussed by lens 26 to a small, point-like or line-like image 30 on upper surface 31 of bi-cell photodetector 28. Curved surface 17 of target feature 16 enables a small, point-like or line-like image 30 of the light source 22 to be focussed on surface 31 of photodetector 28.

Bi-cell detector 28 includes two photodetector cells A and B separated by narrow strip 32. As object 14 moves in direction X, point image 30 moves across surface 31 of bi-cell detector 28 in the opposite direction X' from cell A to cell B. Point image 30 is shown in FIG. 2 as being located on strip 32 between cells A and B. The sensor could be calibrated to have a null or reference position (a position in which object 14 is at a desired location) when point image 30 is focussed on strip 32 between cells A and B.

Each cell A or B of bi-cell photodetector 28 produces an analog electric signal having an amplitude that depends upon the location of the point image 30 on the cell surface. Each cell produces the strongest electric signal when the point image 30 is located wholly upon the surface of that cell. By monitoring the ratio of (A−B)/(A+B), where A and B respectively denote the amplitudes of the electric signals produced by cells A and B of detector 28, the position of point image 30 on the surface of photodetector 28 can be monitored and, thereby, the position of object 14 (relative to the stationary light source and photodetector) also can be monitored. This is so because the position of the point image 30 on the surface of photodetector 28 is linearly related to the relative position of object 14. The ratio of (A−B)/(A+B) can be monitored with the use of processing circuitry (see FIG. 6B) that would be electrically connected to the outputs of bi-cell detector 28. Such circuitry could include digital signal processing circuitry that could be connected to a computer having a display such that a user could easily visually monitor the position of object 14.

In this embodiment, in order to reduce the sensitivity of the sensor to vertical movements (away from or toward the laser diode and photodetector) of the object, the plane formed by the incident laser beam 12 and reflected laser beam 18 is substantially orthogonal to an axis formed between the center points of cell A and cell B and is substantially parallel to strip 32. Thus, for example, if the object 14 moves from a first position, such as the one shown in FIG. 2, vertically (away from the laser diode and photodetector) in the direction of arrow Z to a second position, the point image 30 would move in the direction of arrow Z' on the surface of photodetector 28, perpendicular to direction X and would not effect the electric output signals of the photodetector.

Additionally, in one embodiment of the invention, as shown in FIG. 2, target feature 16 has a longitudinal axis that is parallel to the plane (shown in dotted lines) formed by incident laser beam 12 and reflected laser beam 18 and is parallel to strip 32 of photodetector 28 so that the sensor will be insensitive to minor lateral movements (in a direction parallel to the longitudinal axis of the target feature) of the object.

Figure 3:
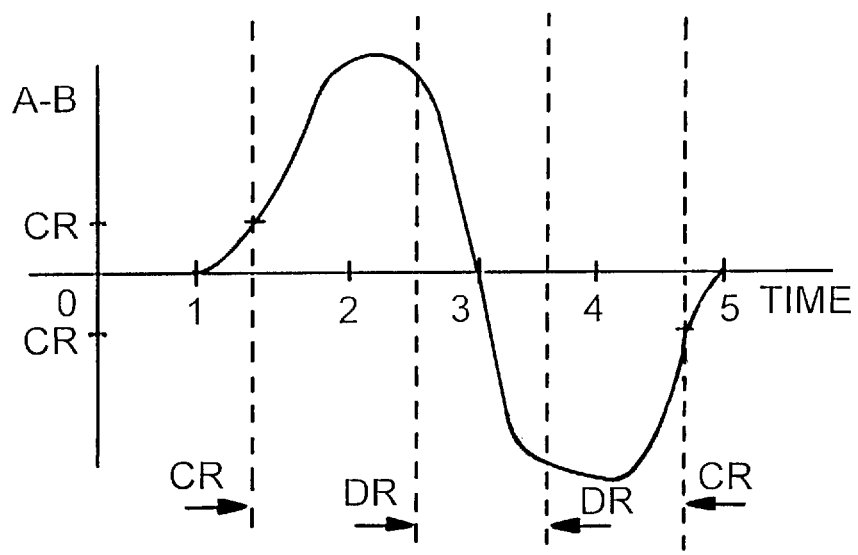
FIG. 3 is a graph illustrating an electric signal produced from the outputs of a bi-cell photodetector according to one embodiment of the present invention.

FIG. 3 is a graph showing the difference (A−B) of the amplitudes of signals A and B versus time as object 14 is moved in the direction of arrow X (shown in FIG. 2). In this example, it is assumed that object 14 is in a position at time zero such that the point image 30 is focussed off of surface 31 of bi-cell photodetector 28 (before reaching the surface of cell A). As object 14 moves in direction X, point image 30 first reaches surface 31 of cell A and then continues across strip 32 to cell B. As seen in FIG. 3, the signal A−B resembles a sine wave.

When point image 30 first reaches the edge of cell A (at time 1), signal A−B begins to increase from zero. As object 14 continues to move in direction X and point image 30 moves from the edge of surface 31 of cell A toward the center point of surface 31 of cell A, signal A−B increases (between times 1 and 2). At time 2, point image 30 is focussed at the center point of surface 31 of cell A and signal A−B is at a positive peak. As the object continues to move in direction X and point image 30 moves from the center point of surface 31 of cell A toward strip 32, signal A−B decreases (during the period between times 2 and time 3). At time 3, point image 30 is located on strip 32 between cells A and B and the signal level of A−B is zero. It should be appreciated that the width of point image 30 is greater than the width of strip 32. Therefore, when point image 30 is located on strip 32, it overlaps onto at least one of cells A and B and signal A+B is greater than zero.

As the object continues to move in direction X and point image 30 moves onto surface 31 of cell B, signal A−B decreases in value until a minimum value (at time 4) when point image 30 is focussed at the center point of surface 31 of cell B. Thus, it can be seen that by observing signal A−B, the position of point image 30 on surface 31 of bi-cell photodetector 28, and thus the linearly related relative position of object 14, can be monitored. Similarly, a displacement between a first position and a second position of object 14 can be measured.

The dynamic range (the range of positions of the object within which accurate measurements can be made) of the sensor falls within the linear range of the A−B signal curve and is shown on the graph of FIG. 3 between dotted lines labeled DR (approximately between times 2.5 and 3.5). Additionally, the system has a minimum capture range which is a minimum accurately detectable level of signal A−B. This capture range is illustrated between dotted lines labeled CR. The slope of the A−B signal curve in the linear dynamic range (in milliamps/micron) corresponds to the responsivity (or sensitivity) of the bi-cell detector. As the slope of the curve in this region increases, the resolution (the minimum detectable displacement of the object) achievable of the sensor increases but the dynamic range of the sensor decreases. Thus, it should be appreciated that with the sensor of the present invention, a balance must be struck between the dynamic range and displacement resolution.

The amplitude of signal A+B (when point image 30 is focussed on surface 31 of bi-cell detector 28) can be maintained approximately constant so that monitoring the ratio of (A−B)/(A+B) can be more simply accomplished only by monitoring signal A−B. Maintaining signal A+B constant can be accomplished by controlling the intensity of input laser beam 12 using automatic gain control (AGC) circuitry (one embodiment of which is described below with reference to FIG. 6A) electrically coupled to the laser diode 22. As described below, the AGC circuitry monitors signal A+B while controlling the power provided to the laser diode. Thus, in order to more simplify the processing circuitry necessary for monitoring the output electrical signals produced by bi-cell detector 28, an AGC circuit can be employed.

The light source 10 can be any type of light source that produces an incident light beam having sufficient intensity to be detected by the photodetector to meet the sensitivity requirements of a particular application. The light source can, for examples, include a laser diode, a light emitting diode (LED), an LED, a tungsten light source, or an optical fiber light source. If an optical fiber light source is employed, then a pair of optical fibers, or a bifurcated fiber, would be employed to direct the reflected laser beams to the photodetector. In one embodiment of the invention, the power of the light source preferably falls within the range of 0.1 milliwatt–20 milliwatt. Also, the strength of the incident laser beam preferably is approximately equal to 1 mwatt/100 μ.

Various types of focussing optical elements can be employed to direct the incident and reflected light or laser beams. For example, conventional lenses, spherical or cylindrical mirrors, GRIN lenses, or molded aspheric lenses can be employed.

The photodetector can be any type of optical photodetector which produces an electric signal having a characteristic (such as amplitude or frequency, for examples) that is proportional to the position on the surface of the detector of the received light beam. The photodetector can, for example, be a position sensor in which the amplitude of the electric signal produced is directly proportional to the location on the sensor where the reflected beam is received. The photodetector preferably includes a spatially arranged photodetector capable of generating a signal or signals from which a ratio (such as $(A-B)/(A+B)$) can be generated. For example, the photodetector can be a bi-cell detector, a quad-cell detector, a CCD array or other.

An advantage of the sensor of the present invention is that by monitoring the ratio of $(A-B)/(A+B)$, the sensor is somewhat insensitive to the strength of the light source, the reflectivity of the target feature and the sensitivity of the photodetector.

In one embodiment of the invention, each cell of the bi-cell detector has dimensions of 0.6 mm by 1.2 mm and the gap between the cells (the width of strip 32) is approximately equal to 10 $\mu$m. The width of image 30 can fall within the range of 50 $\mu$m–100 $\mu$m. A standard sensitivity for such photodetector is approximately equal to 0.4 amps/watt.

In a typical application, such as a servo system application (as will be described hereinafter), lens 26 may be located approximately equidistant between target feature 16 and photodetector 28, approximately 20 mm from each. Reflected beam lens 26 conventionally has a 10 mm focal length. The radius of curvature of curved surface 17 of the target feature 16 preferably falls within the range of 0.5–5.0 mm in one embodiment of the invention.

Figure 4:
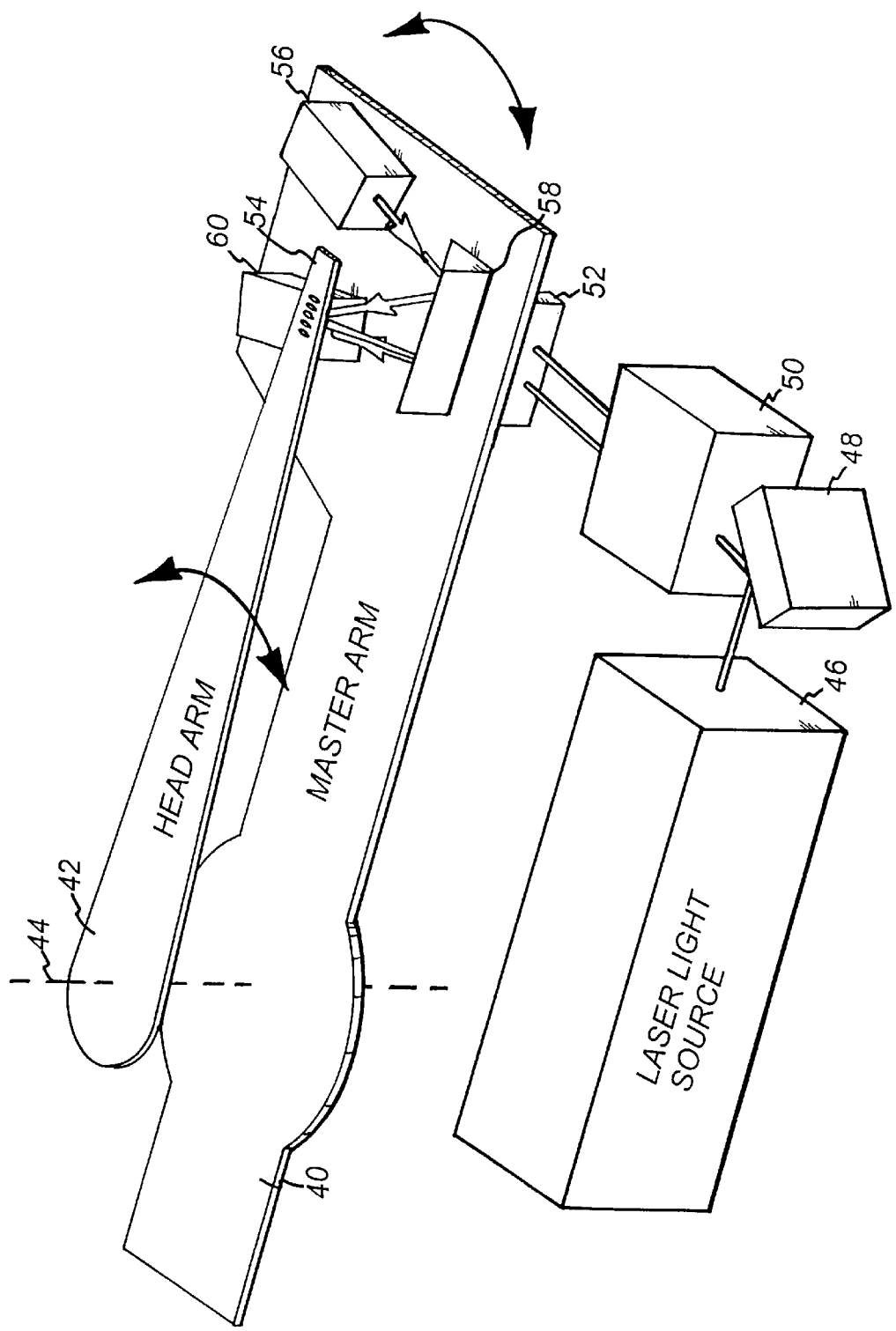
FIG. 4 is a detailed block diagram of a disk drive servo system according to another embodiment of the present invention.

FIG. 4 is a diagram showing another embodiment of the present invention in which the optical displacement sensor is used in a disk drive servo system. As shown, the servo system conventionally includes rotatable master arm 40 (located externally of the disk drive) and read/write head arm 42 (located within the disk drive). Both master arm 40 and head arm 42 rotate about common axis 44. Attached to the upper surface of end 54 of head arm 42 through a flexure (not shown) is a read/write head (not shown). The disk (also not shown), to which data is written and from which data is read, is located above the head arm.

As is conventional in disk drive servo systems, the master arm first is rotated to a reference position in alignment with a radial track location to be written to or read from. Then, through use of the optical displacement sensor system of the present invention, the head arm is rotated to be in alignment with the master arm so that the read/write head can read from or write to the desired radial track location of the disk.

Figure 5:
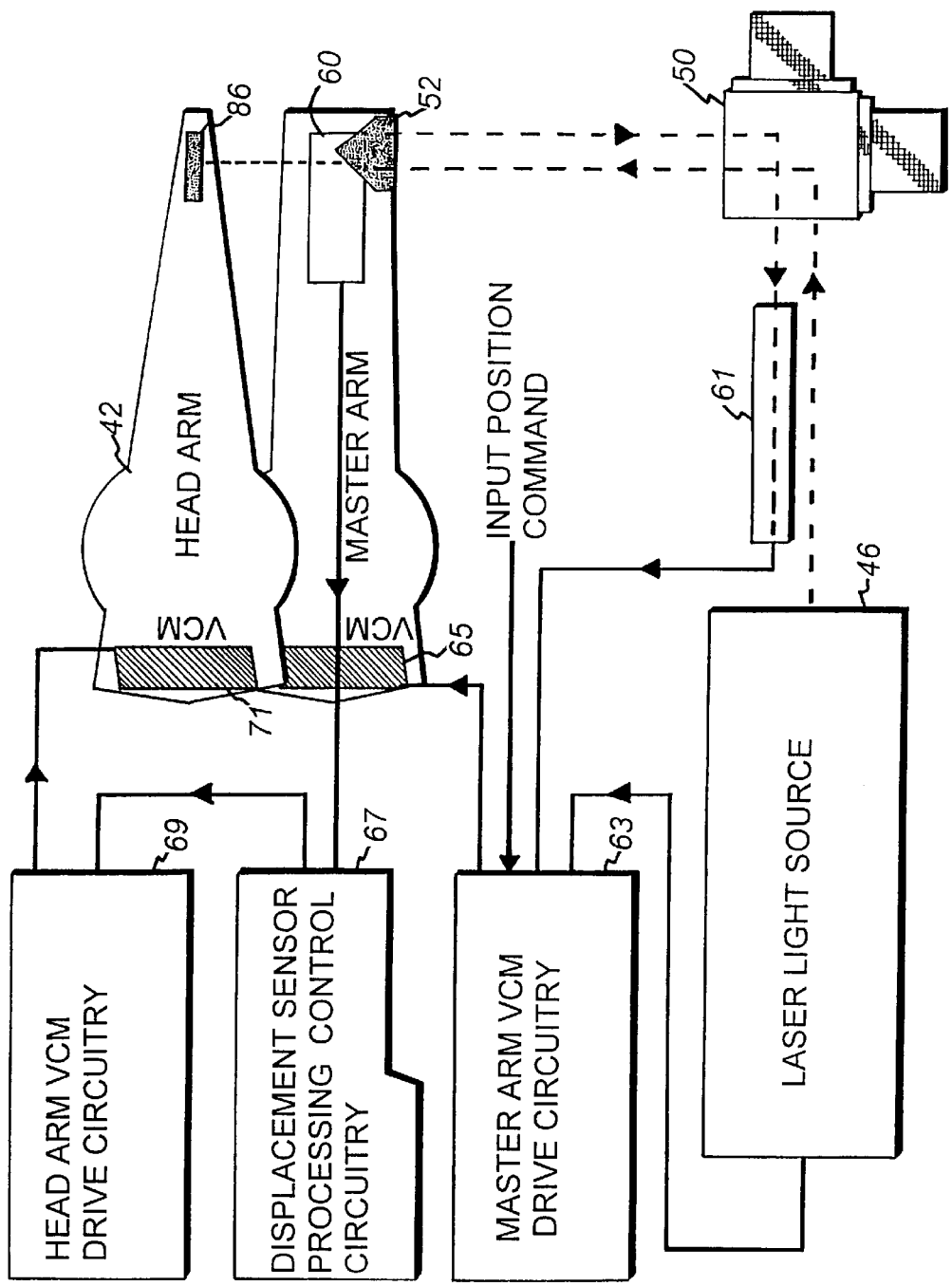
FIG. 5 is a part structural, part functional block diagram illustrating operation of the disk drive servo system of the present invention.

The master arm first is aligned using an interferometric optical system. The interferometric system includes a laser source 46, a fold mirror 48, a laser interferometer 50, a retroreflector 52, attached to the underside of master arm 40, and an interferometer output signal detector 61 (shown in FIG. 5). Master arm VCM drive circuitry 63 is coupled between interferometer output signal detector 61 and voice coil motor (VCM) 65, which controls the rotational movement of master arm 40.

As should be understood, a laser interferometer employs a first laser beam, which reflects off of a moving target (i.e., retroflector 52), and a reference laser beam, which travels a fixed distance, to determine the position (or displacement) of the moving target. The laser source 46 produces a laser beam which reflects from fold mirror 48 through laser interferometer 50 to retroreflector 52. The beam is reflected by retroreflector 52 and is combined with a reference beam by interferometer 50. Interferometer 50 provides the combined beams to detector 61 which, in response, determines the displacement (or change in position) of master arm 40. Then, detector 61 sends a signal indicative of the position change to drive circuitry 63 which, in turn, provides a signal to VCM 65 to rotate master arm 40 until it is aligned with the selected radial track location. Once the master arm 40 is properly aligned, head arm 42 then is aligned with master arm 40 using the displacement sensor of the present invention. The sensor includes source module 56 (preferably including a laser diode), reflector 58 and detector module 60 (preferably including a bi-cell photodetector), all attached to an upper surface of master arm 40. Like the general embodiment of the displacement sensor of the invention described above with reference to FIGS. 1 and 2, during operation, the laser diode within source module 56 produces an incident laser beam which is reflected by reflector 58 to a target feature (not shown) integral with, or attached to, the underside of end 54 of head arm 42. As described above, the target feature has a curved surface from which the incident laser beam is reflected. The reflected laser beam then is reflected from reflector 58 to detector module 60.

The system is calibrated such that when head arm 42 is properly aligned with master arm 40, a small, point-like or line-like image 30 (see FIG. 2) is focussed on the surface of dividing strip 32 between cells A and B of the bi-cell detector within detector module 60. Displacement sensor processing control circuitry 67 (shown in FIG. 5) is electrically connected to source module 56 and detector module 60 (FIG. 4) and, as will be described in more detail below, includes circuitry for determining and monitoring the values of signals A+B and A−B, which signals represent the relative positions of the head and master arms. Head arm VCM drive circuitry 69 is coupled between displacement sensor processing control circuitry 67 and head arm VCM 71. Displacement sensor processing control circuitry 67 provides a digital output signal indicative of the relative head arm and master arm positions to head arm VCM drive circuitry 69 which, in response, provides a control signal to VCM 71 to rotate head arm 42 until it is aligned with master arm 40. As will be described in greater detail below with reference to FIG. 6A, the sensor also includes AGC circuitry, coupled between the photodetector and laser diode, for maintaining constant signal A+B.

Figure 6A:
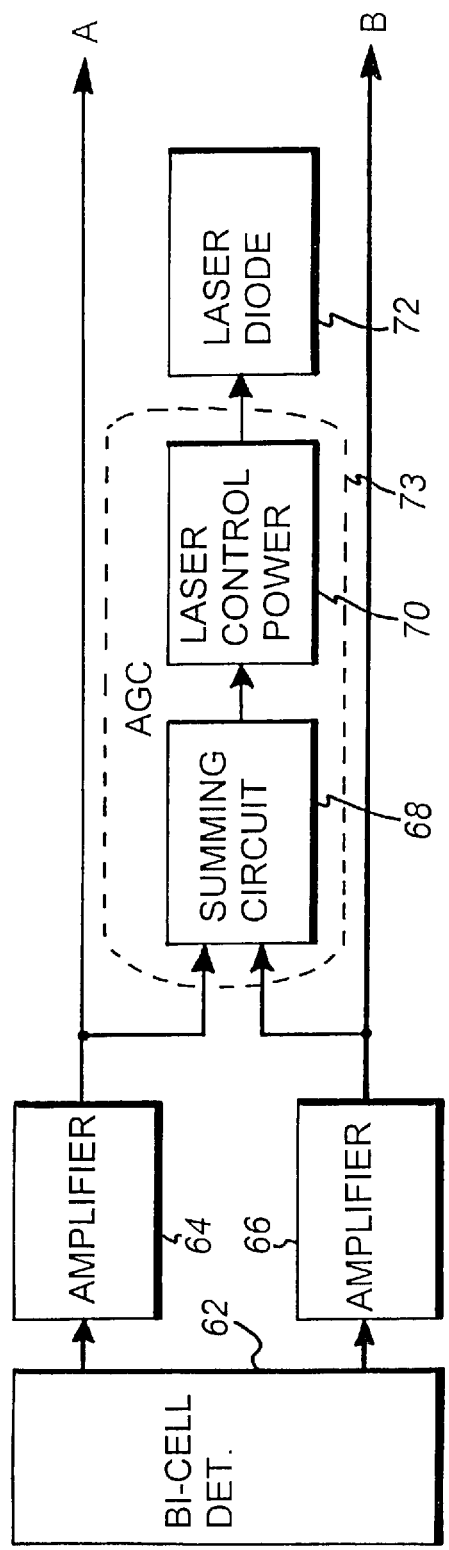
FIGS. 6a and 6b are electrical block diagrams of the processing circuitry of the disk drive servo system of the present invention.

FIG. 6A shows in block diagram form, the sensor AGC circuitry of the present invention. The circuitry is shown as including bi-cell detector 62 (included within detector module 60) and laser diode 72 (included within source module 56) for description convenience. The circuitry includes conventional analog signal amplifiers 64 and 66 connected to respectively receive output signals A and B from bi-cell detector 62. Analog amplifiers 64 and 66 respectively amplify analog signals A and B. The amplified analog signals A and B are provided as outputs and also are provided to AGC circuit 73. AGC circuit 73 consists of analog summing circuit 68 and laser control power circuit 70. Summing circuit 68 produces sum signal A+B. Signal A+B is provided to laser control power circuit 70 which monitors the magnitude of sum signal A+B and, in turn, provides an output signal to control the power of laser diode 72 signal A+B is maintained substantially constant. It should be appreciated that the intensity of the incident laser beam produced by the laser diode may vary as the reflectance of the target, for example, varies, in order that signal A+B be maintained constant.

Figure 6B:
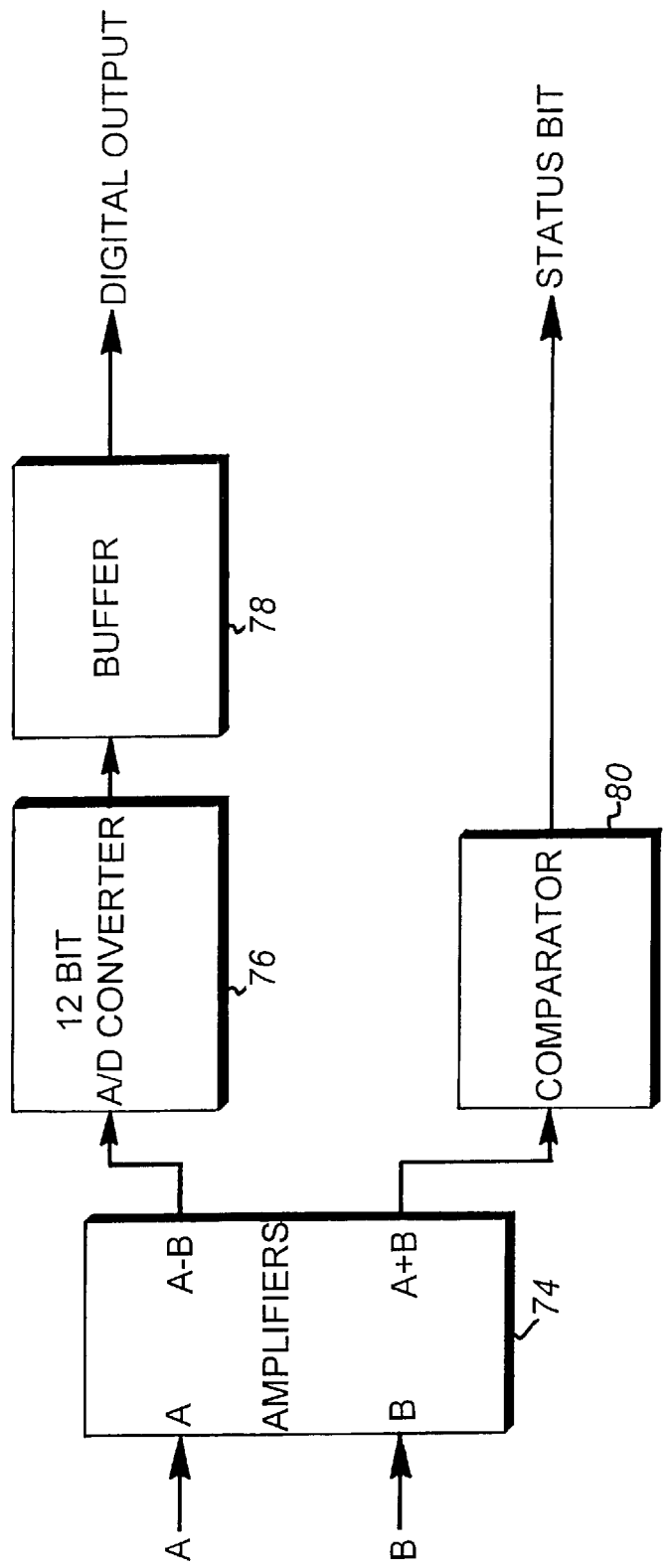

FIG. 6B shows, in block diagram form, head arm processing control circuitry 69 which controls head arm VCM 71. As shown, signals A and B are received by block 74 which includes amplifiers and adder and subtractor circuits for producing signals A–B and A+B. Signal A–B is provided to an analog-to-digital converter (ADC) 76 which converts analog signal A–B to a digital signal. The digital signal is provided to a conventional buffer 78 which provides a digital output representing signal A–B.

Signal A+B is provided to comparator 80 which compares signal A+B with a reference signal (a minimum threshold level [i.e., zero]) and provides a status output bit indicative of whether signal A+B is greater than the minimum threshold level. Circuitry 69 controls VCM 71 to rotate head arm 42 until signal A–B is equal to zero and it is determined that such zero crossing point (of signal A–B) corresponds to the point when the image point is focussed on the strip between the cells of the bi-cell detector (indicating that head arm 42 and master arm 44 are in alignment). It should be appreciated (as discussed above with reference to FIG. 3) that signal A–B also may have a value of zero when the point image is not located on the surface of either of the cells of the bi-cell detector (indicating that head arm 42 and master arm 40 are significantly out of alignment). The circuitry determines that the appropriate zero crossing is reached by monitoring signal A+B with comparator 80. With reference to FIG. 3, it should be understood that the appropriate zero crossing point of signal A–B is reached when signal A–B is equal to zero and signal A+B is greater than zero. When comparator 80 determines that signal A+B is greater than zero, a status bit is output. Thus, the digital output signal provided by buffer 78 and status bit provided by comparator 80 together indicate when head harm 42 and master arm 40 are properly aligned.

Figure 7:
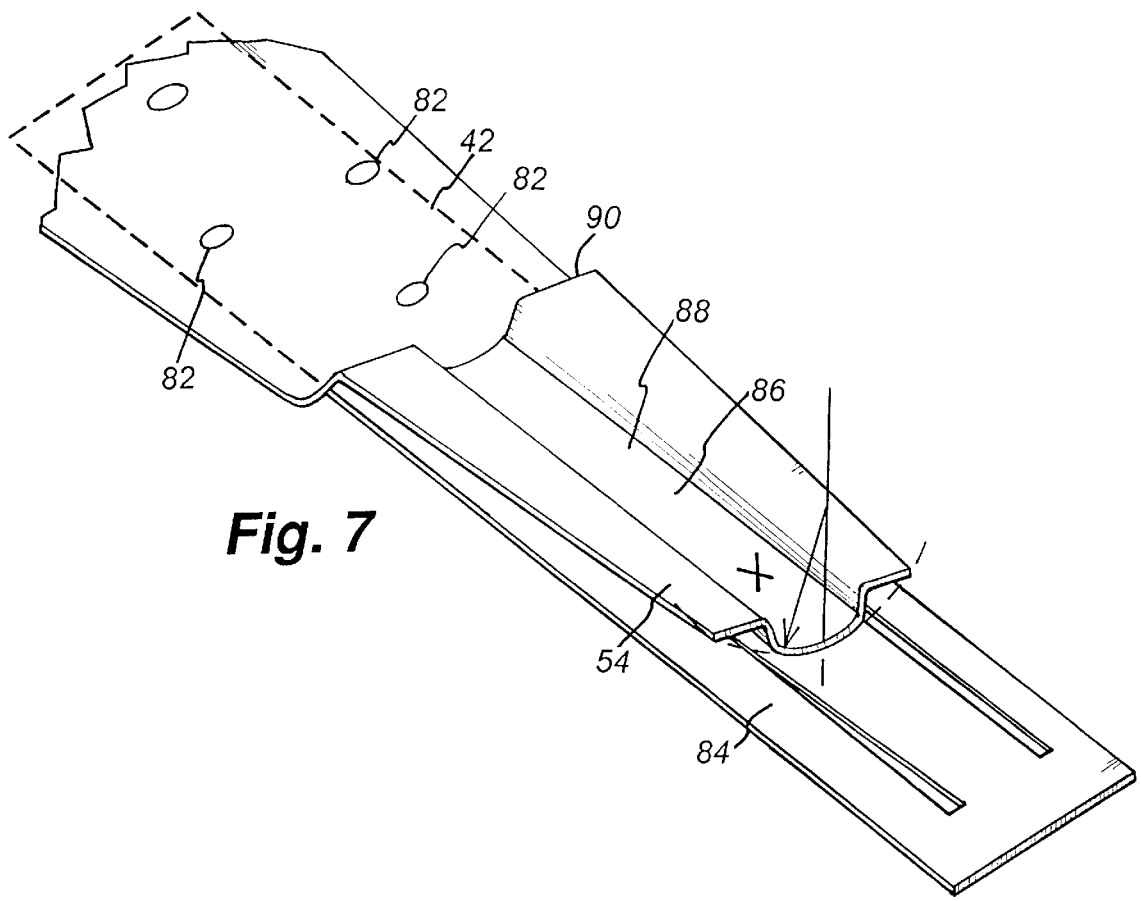
FIG. 7 is a detailed diagram of one embodiment of the target feature employed in the disk drive servo system of the present invention.
Figure 8:
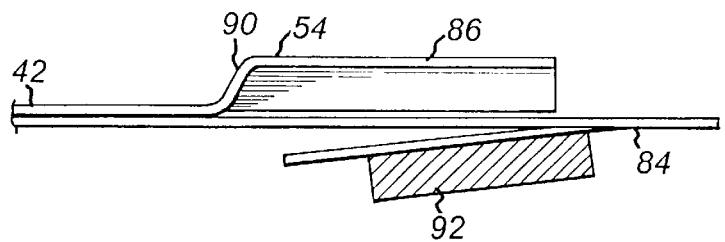
FIG. 8 is a diagram of the side view of the target feature and head arm tip shown in FIG. 7.

FIG. 7 shows in more detail, end 54 of head arm 42. The bottom surface of head arm 42 is shown to illustrate target feature 86. A slider flexure 84 is attached to the upper surface of head arm 42 by welding. Spot welds 82 are shown. A slider and read/write head (not shown) are connected to the tip of flexure 84. Such a construction of the flexure, slider and read/write head is conventional.

In one embodiment of the invention, the target feature 86 is formed integral with end 54 of head arm 42. The target feature can be stamped into end 54 of head arm 42 using a stamping tool that produces a curved surface preferably having a longitudinal axis parallel to the longitudinal axis of head arm. The target feature can, for example, be a cylindrical indent 88 within the head arm 42, as shown. The cylindrical indent 88 provides the curved surface of the target feature 86 that reflects the incident laser beam. The radius of curvature of the curved surface preferably falls within the range of 0.5–5.0 mm in this embodiment.

FIG. 7 is a side view of end 54 of head arm 42 showing slider 92 attached to flexure 84. As shown, slider 92 is located beneath target feature 86 at approximately the same longitudinal point along the head arm 42. Also shown is a shoulder 90 which elevates target feature 86 slightly above the remainder of head arm 42.

Referring both to FIGS. 4 and 6, it should be appreciated that a plane formed by the incident laser beam and reflected laser beam preferably is parallel to the longitudinal axis of the target feature 86. That plane also preferably is orthogonal to an axis formed through the center point of each cell of the bi-cell detector.

Having thus described at least one illustrative embodiment of the invention, various alterations, modifications and improvements will readily occur to those skilled in the art. For example, while the sensor of the invention was described as one which monitors the position in one dimension (or direction) of an object, by employing a bi-cell detector, it should be appreciated that the invention is not so limited. By employing a quad-cell detector, the sensor could respectively monitor the position of an object in two dimensions. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A device for measuring the displacement in a desired direction of a movable object comprising:

a stationary light source that produces an incident light beam;

a target feature, attached to the object, having a curved surface that reflects the incident light beam as a reflected beam;

an imaging lens, that receives the reflected light beam and forms an image of the light source on a photodetector; and the photodetector, spaced from the object, that receives the image and, in response thereto, produces an electric signal having a characteristic which is proportional to a received location along a linear line on the photodetector of the image and which represents a position of the object such that the photodetector detects a linear displacement of the image in a first direction along the linear line;

wherein movement of the object in the desired direction perpendicular to a plane formed by the incident light beam and the reflected light beam corresponds to movement of the image in the first direction, such that the photodetector is relatively insensitive to movements of the object other than in the desired direction.

2. The device as claimed in claim 1 wherein the photodetector includes a bi-cell photodetector.

3. The device as claimed in claim 2 wherein an axis formed through center points of the cells of the bi-cell detector is substantially parallel to the first direction.

4. The device as claimed in claim 1 wherein the photodetector includes a position sensor.

5. The device as claimed in claim 1 wherein the target feature has a radius of curvature within the range of 0.2–5.0 mm.

6. A device for measuring the displacement of a movable object comprising:

a stationary light source that produces an incident light beam;

a target feature, attached to the object, that reflects the incident light beam;

a stationary photodetector, spaced from the object, that receives the reflected light beam and, in response thereto, produces an electric signal having a characteristic which is proportional to a received location on the photodetector of the reflected light beam and which represents a position of the object; and an imaging lens, that receives the reflected light beam and focusses an image of the light source on the photodetector; and wherein the target feature is integral with the object.

7. An optical position sensing device for sensing a position of a read/write head arm relative to that of a master arm in a disk drive, the device comprising:

a light source, attached to the master arm, that produces an incident light beam;

a target feature, attached to the head arm, having a curved surface that reflects the incident light beam as a reflected beam;

an imaging lens, that receives the reflected beam and forms an image of the light source on a photodetector;

the photodetector, attached to the master arm, that receives the image and detects a linear displacement of the image in a first direction; and wherein relative rotational movements of the head and/or master arms cause movement of the image in the first direction such that the device is significantly insensitive to other movements of the target feature.

8. The device as claimed in claim 7 wherein the photodetector includes a bi-cell photodetector.

9. The device as claimed in claim 8 wherein an axis formed through a center point of each cell of the bi-cell detector is substantially parallel to the first direction.

10. The device as claimed in claim 7 wherein the photodetector includes a position-sensing sensor.

11. The device as claimed in claim 7 wherein the target feature is integral with the head arm.

12. The device as claimed in claim 8 wherein the target feature has a radius of curvature within the range of 0.2–5.0 mm.

13. The device as claimed in claim 7 wherein the target feature and a read/write head are located adjacent a tip of the head arm.

14. A device as claimed in claim 13 wherein the target feature and read/write head are located on opposite sides of the head arm.

15. An optical position sensing device for sensing a position of a read/write head arm relative to that of a master arm in a disk drive, the device comprising:

a light source, attached to the master arm, that produces an incident light beam;

a target feature, attached to the head arm, that reflects the incident light beam as a reflected beam;

an imaging lens that receives the reflected beam and focusses an image of the light source;

a photodetector, attached to the master arm, that receives the image and, in response thereto, produces an electric signal having a characteristic which is proportional to a received location on the photodetector of the image and which represents a relative position of the head arm; and wherein the head arm and the master arm share a common axis of rotation.

16. A method of measuring the displacement of a movable object in a desired direction comprising the steps of:

producing an incident light beam with a stationary light source;

reflecting the incident light beam from a curved surface of a target feature, attached to the object as a reflected light beam, wherein the incident light beam and the reflected light beam form a plane perpendicular to a direction of motion to be measured;

focussing the reflected light beam as an image of the light source onto a stationary photodetector; and detecting, with the photodetector, a linear displacement of the image in a first direction, which displacement of the image in the first direction corresponds to displacement of the object in the desired direction.

* * * * *